Patented Feb. 4, 1941

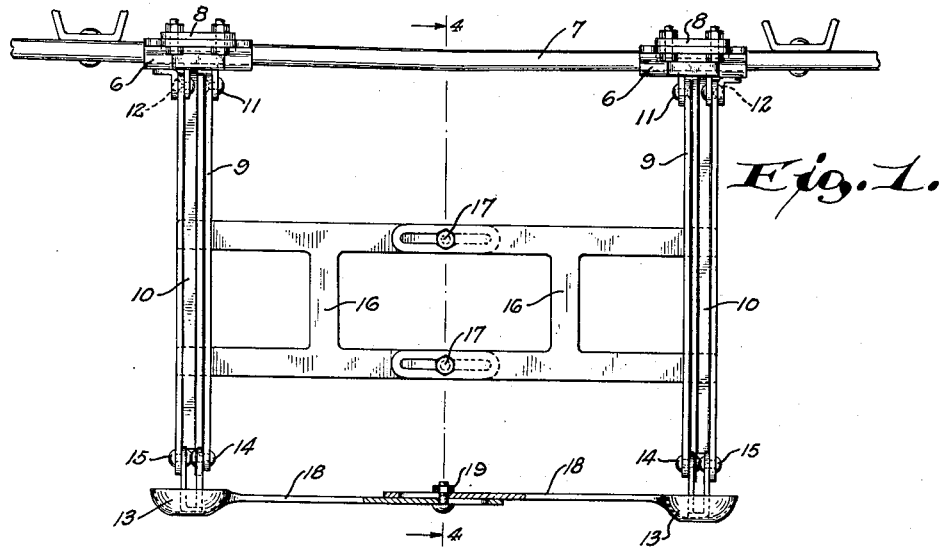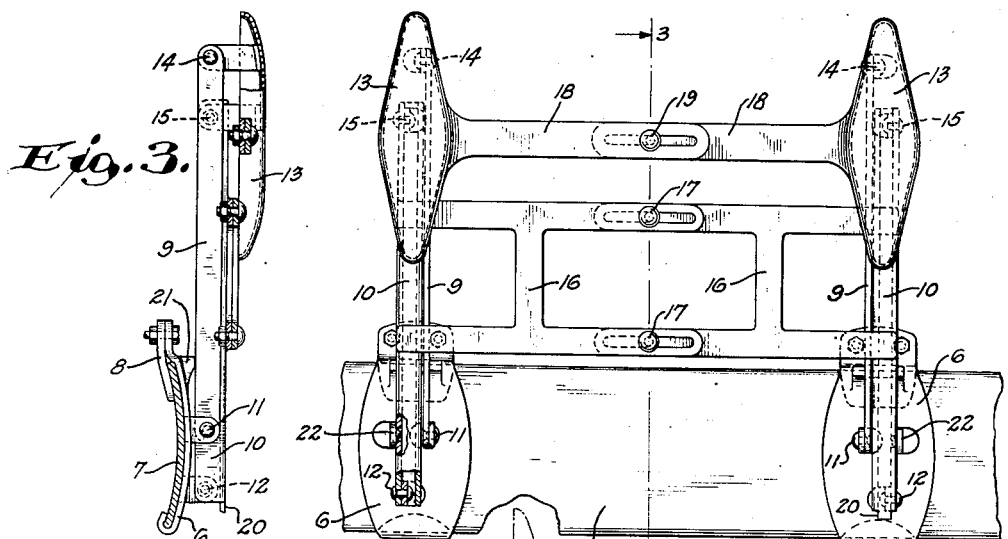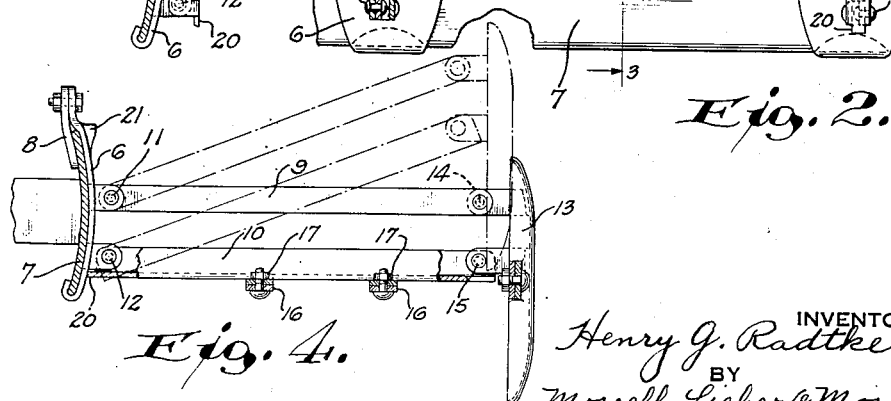

2,230,516

UNITED STATES PATENT OFFICE 2,230,516

VEHICLE PARKING ACCESSORY

Henry G. Radtke, Milwaukee, Wis.

Application July 1, 1939, Serial No. 282,363

13 Claims. (Cl. 293—55)

The present invention relates generally to improvements in vehicle accessories and relates more specifically to improvements in extensible end protectors or bumpers for automobiles or the like.

Generally stated, an object of the present invention is to provide an improved vehicle parking accessory, which may be readily constructed and operated, and which is moreover highly efficient and practical in operation.

A more specific object of the invention is to provide a simple accessory for maintaining sufficient clearance at the ends of a vehicle to permit the same to be readily removed from a parking space.

A further specific object of my invention is to provide a parking guard for automobiles which will prevent other vehicles from ramming directly against the parked car.

A still further specific object of this invention is to provide an improved bumper guard which is adjustable toward and away from the bumper so as to increase or diminish the overall length of the vehicle with which the guard is associated.

Another specific object of the invention is to provide a new and useful automobile accessory which can be utilized for various purposes, such as a parking clearance maintainer, a baggage carrier, or a bumper guard.

Still another specific object of the invention is to provide a universally adjustable appliance which is associable with the bumper of any standard automobile, for the purpose of protecting the vehicle and for maintaining parking clearances.

An additional specific object of the present invention is to provide a new and useful adjustable bumper supported grill guard and extensible bumper which is simple in construction, and which may be manufactured and sold at moderate cost.

These and other specific objects of the invention will be apparent from the following detailed description.

A clear conception of the several features constituting the present improvements, and of the mode of constructing and of utilizing parking accessories built in accordance with my present invention, may be had by referring to the drawing accompanying and forming a part of this specification wherein like reference characters designate the same or similar parts in the various views:

Fig. 1 is a top view of the device as applied to a portion of a vehicle bumper and showing the appliance in lowered horizontal position of adjustment;

Fig. 2 is a front view of the device as applied to a portion of a vehicle bumper and showing the appliance in vertical position of adjustment;

Fig. 3 is a vertical section through the assemblage, taken along the line 3—3 of Fig. 2; and Fig. 4 is a vertical section through the assemblage, taken along the line 4—4 of Fig. 1.

While the invention has been shown herein as being specifically applied to a curved sheet-metal automobile bumper, it is not desired to unnecessarily restrict the scope by such specific embodiment.

Referring to the drawing, the improved parking accessory comprises in general brackets or plates 6 formed for rigid attachment to a bumper 7 by means of clamping plates 8 and clamping bolts, radius rods or bars 9, 10 pivotally mounted on the plates 6 by means of pivots 11, 12 respectively, and bumper guards or members 13 pivotally attached to the bars 9, 10 by means of pivots 14, 15 respectively. An adjustable brace 16 carrying adjustment bolts 17 is rigidly secured to the bars 10 intermediate the pivots 12, 15, and the bumper members 13 are formed with integral arms 18 which are adjustably secured to each other by means of adjustment bolt 19. Stop projections 20 are formed integral with the lower bars 10 and coact with the plates 6 to limit the downward swinging movement of the bars 10 to a horizontal position of adjustment, as shown in Fig. 4, and stop lugs 21 formed integral with the plates 6 are provided to coact with both sets of bars 9, 10, as clearly shown in Fig. 3, to limit the upward swinging movement of the bars 9, 10 to a vertical position of adjustment. Retaining clips or snaps 22 stamped from the plates 6 are also provided and coact with the bars 10 to retain said bars in vertical position, as shown in Fig. 2. Commercial manufacture of the device may be facilitated by constructing the various parts of sheet metal with the aid of punches and dies, and by using a relatively heavy sheet metal, a very rigid assemblage will result.

Normally the assemblage is secured to a vehicle bumper 7 by positioning the plates 6 thereagainst and subsequently applying the clamping plates 8 and tightening the clamping bolts. Adjustments longitudinally of the bumper 7 may be made by loosening the adjustment bolts 17, 19 and subsequently adjusting the brace 16 and bumper member arms 18 to the desired position toward or away from each other previous to securing the clamping plates 8 to the bumper 7. If the device is to be utilized as a luggage carrier it will be lowered away from the vehicle to a horizontal position as shown in Figs. 1 and 4 with the stop projections 20 in snug contact with the plates 6 to maintain the bars 9, 10 in a horizontal plane. It may thus be seen that the device forms a rack upon which luggage may be secured, the brace 16 forming a suitable base for the receptacle.

The device may also be utilized in horizontal position for parking the vehicle. Very often there is adequate parking space in the street when the operator parks, but when he returns to leave the parking space, other vehicles have been parked so close to his front and rear bumpers that it takes considerable maneuvering to remove the vehicle from the parking space. By lowering the improved device immediately after parking, the operator is assured that he will have ample room for removing his vehicle as the device provides an extensible bumper when in horizontal position and prevents other cars from ramming against the parked vehicle. When the operator wishes to remove his vehicle, he need only raise the device to vertical position and he has ample clearance; and by utilizing one of the improved accessories at each end of the vehicle, this clearance may obviously be doubled.

When the device is in vertical position of adjustment, as shown in Figs. 2 and 3, it provides an attractive grill or trunk guard and prevents damage to the vehicle when bumped in the front or rear. The stop lugs 21 stop the bars 9, 10 at a vertical position and the retaining clips 22 coact with the bars 10 to retain the device in such vertical position; and the stop projections 20 prevent lowering beyond horizontal position.

It should be noted that the pivotal arrangement of the bars 9, 10 is such that they always maintain a position parallel to each other and pivotally cooperate with the bumper members 13 to maintain the members 13 in vertical positions at all times, as clearly shown in dot-and-dash lines in Fig. 4. This may be attributed to the fact that the pivot pins 11, 12, 14, 15 are positioned at the four corners of a parallelogram and the result of this arrangement is that the device need only be raised or lowered by the arms 18 without further adjustment and the bumper members 13 will always assume their proper position. The various adjustments may also be effected in other ways than those shown, and swinging motion of the guards may also be effected in an obvious manner from a remote station such as the vehicle driver's seat, either by hand or by a motor transmitting motion through any suitable screw and nut mechanism or gearing.

It should be understood that it is not desired to limit this invention to the exact details of construction or to the precise mode of operation, herein shown and described, for various modifications within the scope of the claims may occur to persons skilled in the art.

I claim:

1. A vehicle accessory comprising, means attachable to an end of the vehicle and being adjustable toward and away from said end in the direction of travel of the vehicle, and a unitary vertically elongated bumper element pivotally carried at its medial portion by, and adapted for vertical disposition at the end of said means remote from the point of attachment thereof to the vehicle.

2. A vehicle accessory comprising, arms pivotally attachable to an end of the vehicle and being swingable toward and away from said end in the direction of travel of the vehicle, and a vertically elongated, one-piece bumper element pivotally carried at its medial portion by the end of said arms remote from the point of attachment thereof to the vehicle.

3. A vehicle accessory comprising, arms pivotally attachable to the bumper of the vehicle and being swingable toward and away from said vehicle in the direction of travel of the vehicle, and a bumper element pivotally carried by the end of said arms remote from the point of attachment thereof to the vehicle bumper, said pivotal attachments being so arranged as to form four corners of a parallelogram.

4. A vehicle accessory comprising, arms pivotally attachable to the bumper of the vehicle and being swingable toward and away from said vehicle in the direction of travel of the vehicle, and a bumper element pivotally carried by the end of said arms remote from the point of attachment thereof to the vehicle bumper, said arms being disposed parallel to each other in all positions of adjustments to maintain the bumper element in a vertical position at all times.

5. A vehicle accessory comprising, dual means attachable to the bumper of the vehicle and being adjustable toward and away from said vehicle in the direction of travel thereof, and cooperable bumper elements carried by the ends of said means remote from the points of attachment thereof to the vehicle bumper, said means and bumper elements being adjustable longitudinally of said vehicle bumper.

6. A vehicle accessory comprising, at least one pair of arms pivotally attachable to the bumper of the vehicle and being swingable toward and away from said vehicle in the direction of travel thereof, and a bumper element carried by the end of each pair of said arms remote from the point of attachment thereof to the vehicle bumper, each of said pairs of arms and said bumper elements being adjustable longitudinally of said vehicle bumper.

7. A vehicle accessory comprising, at least one pair of arms pivotally attachable to the bumper of the vehicle and being swingable toward and away from said vehicle in the direction of travel thereof, an adjustable brace supported between each of said pairs of arms, and a bumper element carried by the end of each pair of said arms remote from the point of attachment thereof to the vehicle bumper, each of said pairs of arms and said bumper elements being adjustable with said brace longitudinally of said vehicle bumper.

8. A vehicle accessory comprising, several pairs of arms pivotally attachable to the bumper of the vehicle and being swingable in approximately the same vertical plane toward and away from said vehicle in the direction of travel thereof, a brace supported by each of said pairs of arms, and a vertically elongated bumper element carried by and adapted for vertical disposition at the ends of said arms remote from the point of attachment thereof to the vehicle bumper.

9. A vehicle accessory comprising, at least one pair of arms pivotally attachable to the bumper of the vehicle and being swingable toward and away from said vehicle in the direction of travel thereof, a brace supported by and between said pairs of arms, a bumper element pivotally carried by the ends of said pairs of arms remote from the points of attachment thereof to the vehicle bumper, and means for uniformly adjusting said brace and bumper element longitudinally of the vehicle bumper.

10. A vehicle accessory comprising, at least one pair of arms pivotally attachable to the bumper of the vehicle, and being swingable toward and away from said vehicle in the direction of travel thereof, a brace supported by and between said pairs of arms, a bumper element pivotally carried by the ends of said pairs of arms remote from the points of attachment thereof to the vehicle bumper, and means for uniformly adjusting said brace and bumper element longitudinally of the vehicle bumper, said arms being pivotally attached to said vehicle bumper and to said bumper element to maintain a parallel alinement between said arms in all positions of adjustment and to maintain the bumper element in a vertical position at all times.

11. A vehicle accessory comprising, arms pivotally attached to the bumper of the vehicle and being swingable toward and away from said vehicle in the direction of travel of the vehicle, and a bumper element pivotally carried by the end of said arms remote from the point of attachment thereof to the vehicle bumper, said arms cooperating with said element to maintain said element in vertical position at all times.

12. A vehicle accessory comprising, at least one pair of constantly parallel arms both pivotally attachable one above the other directly to the bumper of the vehicle and being swingable toward and away from said vehicle in the direction of travel thereof, and a bumper element carried by the ends of said arms remote from the point of attachment thereof to the vehicle bumper.

13. A vehicle accessory comprising, at least one pair of constantly parallel arms both pivotally attachable one above the the other directly to the bumper of the vehicle and being swingable toward and away from said vehicle in the direction of travel thereof, and a vertically elongated bumper element carried by and constantly maintained in a vertical position at the ends of said arms remote from the point of attachment thereof to the vehicle bumper.

HENRY G. RADTKE.